N. T. FOGG.
MEDICAL APPLIANCE.
APPLICATION FILED FEB. 6, 1915.

1,137,393.

Patented Apr. 27, 1915.

Witnesses;
M. L. Waite
E. W. Waite

Inventor,
Newell T. Fogg;
By A. B. Upham.
Attorney.

UNITED STATES PATENT OFFICE.

NEWELL T. FOGG, OF SANFORD, MAINE.

MEDICAL APPLIANCE.

1,137,393.     Specification of Letters Patent.     Patented Apr. 27, 1915.

Application filed February 6, 1915. Serial No. 6,542.

*To all whom it may concern:*

Be it known that I, NEWELL T. FOGG, a citizen of the United States, and a resident of Sanford, in the county of York and State of Maine, have invented certain new and useful Improvements in Medical Appliances, of which the following is a full, clear, and exact specification.

The object of this invention is the construction of a simple, inexpensive and effective means for throwing the rays of sunlight into the throat, and surrounding parts, for the purpose of killing bacteria which may have secured a lodgment therein.

To this end, my invention comprises a conical member having a light-concentrating means at one end adapted to direct the rays toward the back of the user's throat; further, a deflecting means for diverting a portion of such rays to other parts of the throat and surrounding parts; and also comprising means adapted to be gripped between the teeth of the user while permitting easy rotation of the member in order to divert the rays or a portion thereof to the different sections of the throat.

Figure 1:
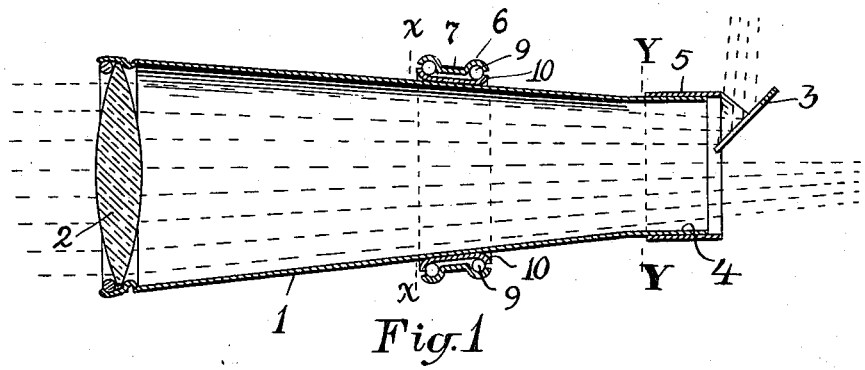
Figure 2:
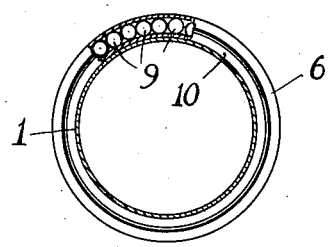
Figure 3:
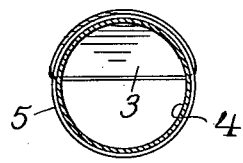

Referring to the drawings forming part of this specification, Figure 1 is a longitudinal section of an appliance embodying my improvements. Fig. 2 is a cross section thereof on the dotted line X X in Fig. 1. Fig. 3 is a cross section on the dotted line Y—Y in Fig. 1.

The body of this appliance consists of a hollow sheet metal conoid 1, carrying at its larger end a lens 2 for concentrating the sun's rays toward the smaller end. This lens should not be of such a focal length as to bring the rays closely to a focus at the back of the throat, inasmuch as the heat thereby concentrated at one point would burn the flesh, but its focal length should be such as to reduce the area covered by the cast rays by about one-fourth their original area.

As the dirrectly cast rays reach only one part of the throat, and it is desired to divert more or less thereof both laterally and vertically, I provide a reflecting surface, as a metal mirror 3, for the small end 4 of the conoid, the same being supported by a collar 5 fitting friction-tight about the cylindrical end 4. By sliding this collar forward or backward on said end 4, the distance of the mirror 3 can be adjusted for different dimensions of throats and mouths. The mirror is preferably set at an angle of about forty-five degrees, and by rotating it about the axis of the conoid 1, the rays reflected thereby can be diverted to any point above, below or beside the same. I prefer to have the mirror 3 intercept but a portion of the light rays, so that all parts of the throat, posterior nasal passages and upper part of the bronchia can be treated at practically the same time.

For permitting the ready rotation of the appliance while gripped between the teeth or lips of the patient, I provide an annulus 6 adapted to receive the teeth or lips in its groove 7, and disposed for easy rotation about the conoid 1. The means for such rotation may be the ball bearings 9 supported between the raceway 10 and said annulus, as shown, the raceway being soldered or otherwise secured in place. The ball bearings being suitably lubricated, and the annulus 6 held in the teeth, the conoid 1 can be most readily rotated for the presentation of the laterally-diverted rays to any points about the throat; while a slight lateral swing thereof will cast the direct rays to different sections of the back of the throat.

The conoid or shell 1 may be made of sheet metal, sheet celluloid and the like, or pressed from any suitable material, and the expense of the appliance may be very small. Moreover, it is not necessary to have the lens made of glass, but the same can be made of transparent celluloid and the like.

The user of the appliance can either sit or recline in the sunshine, with the conoid held between his teeth and directed toward the sun, and by a slow oscillation and rotation thereof, cause the concentrated sun's rays to strike practically every portion of his throat and immediate connections, thereby insuring the destruction of the bacilli of tuberculosis and other diseases, which may have lodged therein.

What I claim is:

1. A medical appliance comprising a sunlight concentrating means, means for supporting the same in front of a patient's mouth, and means for holding the patient's mouth open and for directing the concentrated rays within the throat of the patient.

2. A medical appliance comprising a conoidal shell, a lens carried in its larger end, and a mirror supported obliquely just outside the smaller end of said shell to intercept a fraction of the light rays cast by said lens.

3. A medical appliance comprising a conoidal shell, a lens carried in its larger end, and means for supporting said parts between the teeth or lips of the user, said means consisting of two spaced annular ridges.

4. A medical appliance comprising a conoidal shell, a light-concentrating means carried at the larger end of said shell, and means for rotatively supporting the appliance between the teeth or lips of the user, said means consisting of a grooved annulus inclosing said shell and rotatably held thereon, the small end of the shell having a mirror.

5. A medical appliance comprising a conoidal shell, a light-concentrating means carried at the larger end of said shell, an oblique mirror at the small end of the shell, a raceway about an intermediate point of said shell, a grooved annulus surrounding said raceway, and ball bearings between the raceway and annulus.

6. A medical appliance comprising a conoidal shell having its smaller end cylindrical for a suitable distance, a light-concentrating means carried at the larger end of said shell, a collar friction-tight on said cylindrical end, and an oblique mirror supported by said collar.

In testimony that I claim the foregoing invention, I have hereunto set my hand this 23rd day of January, 1915.

NEWELL T. FOGG.

Witnesses:
F. W. J. ALLEN,
HIRAM WILLARD.